US008941751B2

(12) United States Patent
Leung et al.

(10) Patent No.: US 8,941,751 B2
(45) Date of Patent: Jan. 27, 2015

(54) HIGHER RESOLUTION STILL IMAGE GENERATION FROM LOWER RESOLUTION VIDEO CAMERA FRAMES

(75) Inventors: Henry Leung, Calgary (CA); Xiaoxiang Liu, Calgary (CA)

(73) Assignee: Empire Technology Development LLC, Wilmington, DE (US)

( * ) Notice: Subject to any disclaimer, the term of this patent is extended or adjusted under 35 U.S.C. 154(b) by 0 days.

(21) Appl. No.: 13/264,236

(22) PCT Filed: May 6, 2011

(86) PCT No.: PCT/US2011/035490
§ 371 (c)(1),
(2), (4) Date: Oct. 13, 2011

(87) PCT Pub. No.: WO2012/154154
PCT Pub. Date: Nov. 15, 2012

(65) Prior Publication Data
US 2014/0049661 A1 Feb. 20, 2014

(51) Int. Cl.
*H04N 5/225* (2006.01)
*H04N 5/232* (2006.01)
*G06T 3/40* (2006.01)
*H04N 5/228* (2006.01)

(52) U.S. Cl.
CPC .......... *H04N 5/23232* (2013.01); *G06T 3/4053* (2013.01); *H04N 5/2254* (2013.01)
USPC .................................. 348/219.1; 348/208.13

(58) Field of Classification Search
USPC .......................................... 348/219.1, 208.13
See application file for complete search history.

(56) References Cited

U.S. PATENT DOCUMENTS

| 5,696,848 | A | 12/1997 | Patti et al. |
| 5,889,553 | A * | 3/1999 | Kino et al. ................. 348/218.1 |
| 6,236,430 | B1 * | 5/2001 | Suzuki et al. .............. 348/219.1 |
| 6,249,312 | B1 * | 6/2001 | Broekaert .................. 348/219.1 |
| 6,256,066 | B1 * | 7/2001 | Yukawa et al. ............. 348/340 |
| 6,359,648 | B1 * | 3/2002 | Fukasaka ................. 348/208.99 |
| 6,650,704 | B1 * | 11/2003 | Carlson et al. ........... 375/240.01 |
| 7,420,592 | B2 * | 9/2008 | Freeman .................... 348/219.1 |
| 7,683,939 | B2 * | 3/2010 | Shinohara et al. ......... 348/219.1 |
| 7,702,184 | B2 | 4/2010 | Aiso |

(Continued)

OTHER PUBLICATIONS

International Search Report and Written Opinion dated Aug. 12, 2011 in PCT Application No. PCT/US11/35490.

(Continued)

*Primary Examiner* — Ngoc-Yen Vu
(74) *Attorney, Agent, or Firm* — Hope Baldauff LLC

(57) ABSTRACT

Technologies are generally described herein for generating a higher resolution still frame. Some example technologies may configure a video camera at a first configuration, which the video camera to capture video at a first pixel offset. The technologies may capture a first frame of al field-of-view through the video camera configured at the first configuration. The first flame may contain the field-of-view captured at the first pixel offset. The technologies may adjust the video camera from the first configuration to a second configuration, which adapts the video camera to capture the video at a second pixel offset, the adjustment using a hardware mechanism. The technologies may capture a second frame of the field-of-view through the video camera configured at the second configuration. The second frame may contain the field-of-view captured at the second pixel offset.

25 Claims, 9 Drawing Sheets

(56) References Cited

U.S. PATENT DOCUMENTS

| | | | |
|---|---|---|---|
| 7,801,441 B2* | 9/2010 | Lazar et al. | 396/322 |
| 7,884,861 B2* | 2/2011 | Vertoprakhov | 348/239 |
| 2005/0057687 A1 | 3/2005 | Irani et al. | |
| 2008/0030592 A1 | 2/2008 | Border et al. | |
| 2008/0080847 A1 | 4/2008 | Feng et al. | |
| 2008/0218611 A1 | 9/2008 | Parulski et al. | |
| 2008/0218613 A1 | 9/2008 | Janson et al. | |
| 2008/0303908 A1 | 12/2008 | Baker et al. | |
| 2009/0123082 A1 | 5/2009 | Atanssov et al. | |
| 2009/0135502 A1 | 5/2009 | Border et al. | |

OTHER PUBLICATIONS

S. P. Kim and W. Y. Su, "Recursive high-resolution reconstruction of blurred multiframe images", IEEE Transactions on Image Processing, vol. 2, pp. 534-539, Oct. 1993.

M. C. Hong, M. G. Kang, and A. K. Katsaggelos, "An Interative Weighted Regularized Algorithm for Impriving the Resolution of Video Sequences", International Conference on Image Processing, vol. 2, pp. 474-477, Oct. 1997.

H. Stark and P. Oskoui, "High resolution image recovery from image-plane arrays, using convex projections", Journal of Optical Society of America, A: Optics and Image Science, vol. 6, pp. 1715-1728, Nov. 1989.

M. Irani and S. Peleg, "Improving resolution by image registration", CVGIP: Graphical Models and Image Processing, vol. 53, pp. 231-239, May 1991.

M. Elad and A. Feuer, "Superresolution restoration of an image sequence: adaptive filtering approach", IEEE Transactions on Image Processing, vol. 8, pp. 387-395, Mar. 1999.

Borman, S., et al., "Spatial Resolution Enhancement of Low-Resolution Image Sequences: A Comprehensive Review with Directions for Future Research," Laboratory for Image and Signal Analysis (LISA), Univ. of Notre Dame, Jul. 8, 1998.

* cited by examiner

804 AT LEAST ONE OF

ONE OR MORE INSTRUCTIONS FOR CONFIGURING A VIDEO CAMERA AT A FIRST CONFIGURATION, THE FIRST CONFIGURATION ADAPTING THE VIDEO CAMERA TO CAPTURE VIDEO AT A FIRST PIXEL OFFSET;

ONE OR MORE INSTRUCTIONS FOR CAPTURING A FIRST FRAME OF A FIELD-OF-VIEW THROUGH THE VIDEO CAMERA CONFIGURED AT THE FIRST CONFIGURATION, THE FIRST FRAME CONTAINING THE FIELD-OF-VIEW CAPTURED AT THE FIRST PIXEL OFFSET;

ONE OR MORE INSTRUCTIONS FOR ADJUSTING THE VIDEO CAMERA FROM THE FIRST CONFIGURATION TO A SECOND CONFIGURATION, THE SECOND CONFIGURATION ADAPTING THE VIDEO CAMERA TO CAPTURE THE VIDEO AT A SECOND PIXEL OFFSET, THE ADJUSTMENT USING A HARDWARE MECHANISM; OR

ONE OR MORE INSTRUCTIONS FOR CAPTURING A SECOND FRAME OF THE FIELD-OF-VIEW THROUGH THE VIDEO CAMERA CONFIGURED AT THE SECOND CONFIGURATION, THE SECOND FRAME CONTAINING THE FIELD-OF-VIEW CAPTURED AT THE SECOND PIXEL OFFSET.

*Fig. 8B*

HIGHER RESOLUTION STILL IMAGE GENERATION FROM LOWER RESOLUTION VIDEO CAMERA FRAMES

BACKGROUND

Unless otherwise indicated herein, the materials described in this section are not prior art to the claims in this application and are not admitted to be prior art by inclusion in this section.

A digital video camera may have a relatively high temporal resolution (e.g., at least thirty frames-per-second) for capturing dynamic visual information over space and time. However, in order for a digital video camera to maintain such a high temporal resolution, a tradeoff is usually made where the digital video camera captures the visual information at a lower spatial resolution (e.g., frame size) when compared to a digital still camera due to physical limitations of the digital video camera. For example, extending the exposure time of a digital still camera or a digital video camera may increase their spatial resolution. However, in the case of a digital video camera, extending the exposure time may reduce the frame rate, which is not a concern for a digital still camera.

A typical consumer digital video camera may have a spatial resolution of about two megapixels, whereas a typical consumer digital still camera may have a spatial resolution of about twelve megapixels or more. Although the spatial resolution of a digital video camera is usually sufficient for general viewing of a video, a user may sometimes wish to more closely inspect a particular frame in the video. In such instances, the user may desire to inspect the frame in a higher spatial resolution in order to view specific details within the frame. Conventional approaches for increasing spatial resolution in digital video cameras can be expensive and in some cases, may lower temporal resolution. Further, by increasing the spatial resolution of each frame in a video, the size of the video may substantially increase, thereby also increasing bandwidth utilized to transmit the video and storage media utilized to store the video.

SUMMARY

The present disclosure generally describes techniques for generating a higher resolution still frame. Some example methods may include configuring a video camera at a first configuration. The first configuration may adapt the video camera to capture video at a first pixel offset. Example methods may include capturing a first frame of a field-of-view through the video camera configured at the first configuration. The first frame may contain the field-of-view captured at the first pixel offset. Example methods may also include adjusting, through a hardware mechanism, the video camera from the first configuration to a second configuration. The second configuration may adapt the video camera to capture the video at a second pixel offset. Example methods may further include capturing a second frame of the field-of-view through the video camera configured at the second configuration. The second frame may contain the field-of-view captured at the second pixel offset.

The present disclosure generally also describes some systems for generating a higher resolution still frame. Some example systems may include a multi-element lens, a focal plane array coupled to the multi-element lens, and a hardware mechanism. The hardware mechanism may be adapted to configure the video camera at a first configuration and to adjust the video camera from the first configuration to a second configuration. The first configuration may adapt the video camera to capture video at a first pixel offset. The second configuration may adapt the video camera to capture the video at a second pixel offset.

The present disclosure generally further describes some computer-readable storage media for generating a higher resolution still frame. The computer-readable storage media may have computer-executable instructions stored thereon which, when executed by a computer, cause the computer to perform one or more operations. Some example computer-executable instructions may cause the computer to configure a video camera at a default configuration. The default configuration may adapt the video camera to capture video at a default pixel offset. Example computer-executable instructions may cause the computer to capture a first frame of a field-of-view through the video camera configured at the default configuration. The first frame may contain the field-of-view captured at the default pixel offset. Example computer-executable instructions may cause the computer to operate a hardware mechanism on the video camera to shift the video camera from the default configuration to a first configuration. The first configuration may adapt the video camera to capture the video at a first pixel offset.

Example computer-executable instructions may cause the computer to capture a second frame of the field-of-view through the video camera configured at the first configuration. The second frame may contain the field-of-view captured at the first pixel offset. The second frame may immediately succeed the first frame. Example computer-executable instructions may cause the computer to operate the hardware mechanism on the video camera to shift the video camera from the first configuration to a second configuration. The second configuration may adapt the video camera to capture the video at a second pixel offset. Example computer-executable instructions may cause the computer to capture a third frame of the field-of-view through the video camera configured at the second configuration. The third frame may contain the field-of-view captured at the second pixel offset. The third frame may immediately succeed the second frame.

Example computer-executable instructions may cause the computer to operate the hardware mechanism on the video camera to shift the video camera from the second configuration to a third configuration. The third configuration may adapt the video camera to capture the video at a third pixel offset. Example computer-executable instructions may cause the computer to capture a fourth frame of the field-of-view through the video camera configured at the third configuration. The fourth frame may contain the field-of-view captured at the third pixel offset. The fourth frame may immediately succeed the third frame. Example computer-executable instructions may cause the computer to operate the hardware mechanism on the video camera to shift the video camera from the third configuration to a fourth configuration. The fourth configuration may adapt the video camera to capture the video at a fourth pixel offset. Example computer-executable instructions may also cause the computer to capture a fifth frame of the field-of-view through the video camera configured at the fourth configuration. The fifth frame may contain the field-of-view captured at the fourth pixel offset. The fifth frame may immediately succeed the fourth frame. Example computer-executable instructions may further cause the computer to generate a higher resolution still frame by integrating the first frame, the second frame, the third frame, the fourth frame, and the fifth frame.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

FIGS. 8A-8B are schematic diagrams illustrating computer program products that include a computer program for executing a computer process on a computing device;

Figure 1:
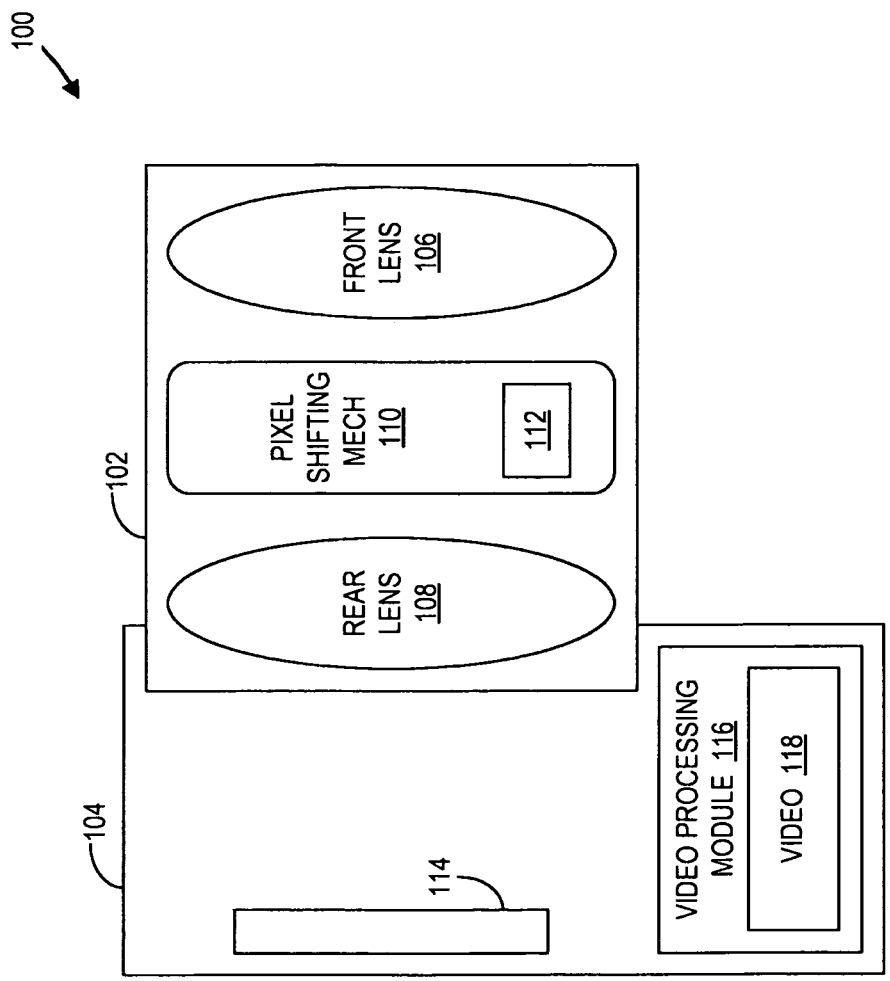
FIG. 1 is a functional block diagram illustrating an example video camera adapted to generate a higher resolution still frame.

all arranged according to at least some embodiments presented herein.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to technologies, including various hardware mechanisms adapted to effectively shift a relative position of pixels at which a video camera captures successive frames of a field-of-view. The shift may be a fractional pixel offset where the hardware mechanisms are configured to change the relative position of the pixels by less than one pixel. The hardware mechanisms may be configured to adjust the video camera such that the video camera captures successive frames at different fractional pixel offsets. These fractional pixel offsets may include multiple directions from a base position.

By capturing successive frames of a field-of-view at different fractional pixel offsets, the video camera may be configured to capture multiple frames of the field-of-view, each frame having pixels that overlap corresponding pixels in at least one other frame in the multiple frames. Because the successive frames in a video are shifted by less than one pixel, a human may not recognize the fractional shifts when viewing the video, especially when the video camera operates at a high temporal resolution where multiple frames are displayed in quick succession. However, various image enhancement techniques may utilize the additional image information provided by the overlapping pixels in the multiple frames in order to generate an enhanced still image of the field-of-view.

Various image enhancement techniques may integrate multiple frames of a video (if the multiple frames have sub-pixel shifts or overlaps) to achieve an enhanced high resolution still image. Some image enhancement techniques may utilize digital signal processing to reconstruct a high resolution still image from multiple frames by estimating the motion parameters in the multiple frames. However, the image enhancement techniques can be "uncontrolled" because the reconstruction performance is largely dependent on the motion parameters estimation, which may not be accurate.

The various hardware mechanisms presented herein can be utilized to shift pixels in a mechanically controllable fashion (or in a more advanced way to adapt to the dynamic environment having movement, shaking, etc.). As a result, the motion of the pixels may be known. The image enhancement techniques can be "controllable" because the hardware mechanisms may reduce or eliminate parameter estimation uncertainty or error in the digital signal processing algorithms. In this way, the image enhancement techniques can produce a more accurate reconstruction result.

Some example visual enhancement techniques for generating an enhanced still image based on multiple lower-resolution images may include computing linear combinations of shifted, overlapping pixels in the lower-resolution images and interleaving raw pixel values of shifted, overlapping pixels in the lower-resolution images. Another example visual enhancement technique may include non-uniform interpolation, where multiple low-resolution frames are mapped into a high resolution grid through non-uniform interpolation (e.g., bilinear interpolation). Other example visual enhancement techniques may include: (1) a frequency domain image reconstruction, which utilizes a well-defined frequency domain relationship between the multiple frames and high resolution image, and applies an inverse filter to obtain the "original" high resolution image; (2) a regularized reconstruction approach; (3) a projection onto convex sets approach; (4) an iterative back-projection approach; and (5) an adaptive filtering approach.

In some embodiments, the various hardware mechanisms presented herein may be implemented as an additional function or feature on a conventional low spatial resolution, high temporal resolution video camera. In this way, the video camera can be adapted to generate a high resolution still image without reducing the frame rate of the video camera. Such a modification may be implemented relatively inexpensively on existing digital video cameras without relying on a complete redesign of the video cameras.

FIG. 1 is a functional block diagram illustrating an example video camera 100 adapted to generate a higher resolution still frame, arranged in accordance with at least some embodiments presented herein. The video camera 100 may include a multi-element lens 102 and a video camera housing 104 coupled to the multi-element lens 102. The multi-element lens 102 may include a front lens 106, a rear lens 108, and a pixel shifting mechanism 110 positioned between the front lens 106 and the rear lens 108. The multi-element lens 102 may be a Fourier lens pair, according to some embodiments. The multi-element lens 102 may also utilize a single lens, according to some other embodiments. The multi-element lens 102 may further include a hardware mechanism 112 coupled to the pixel shifting mechanism 110. The video camera housing 104 may include a focal plane array 114 and a video processing module 116.

The focal plane array 114 may be configured to collect light received through the multi-element lens 102. The video processing module 116 may be configured to process the light collected by the focal plane array 114 over a period of time in order to generate multiple frames. The video processing module 116 may then be configured to generate a video 118 by integrating these multiple frames in succession. The focal plane array 114 may be implemented as a charged coupled device ("CCD") sensor array or a complementary metal oxide semiconductor ("CMOS") sensor array, according to some embodiments.

In some embodiments, the pixel shifting mechanism 110 may be an adaptive optic, such as plain glass. Generally, adaptive optics may enable dynamic and precise control over an optical wave front. The hardware mechanism 112 may be configured to drive the adaptive optic in order to change a shift magnification of the multi-element lens 102 from multiple pixels to fractional pixels. By changing the shift magnification of the multi-element lens 102 from multiple pixels to fractional pixels, the adaptive optic may effectively shift projected pixels on the focal plane array 114 by a fractional offset of less than one pixel. The hardware mechanism 112 may be configured to drive the adaptive optic in various configurations in order to shift projected pixels in multiple directions relative to a base position.

The basic premise for increasing spatial resolution is the availability of multiple low resolution frames shifted with sub-pixel precision. If the low resolution frames are shifted by integer units, then each frame may contain the same information, and thus there is now new information that can be used to reconstruct a high resolution image. In such a context, shift magnification may be configured by the mechanical instrument in the design (e.g., a lens actuator) to ensure the sub-pixel shifts. For example, four low resolution frames may be generated by a decimation factor of two in both horizontal and vertical directions from the high resolution image. The shift magnification here may refer to the decimation factor of two. The mechanical component can be designed to allow for an adjustable shift magnification. The adjustable shift magnification may allow for image enhancement technologies to adapt a dynamic scene (e.g., by adaptively adjusting the shift parameters) within a particular reconstruction algorithm.

In some embodiments, the hardware mechanism 112 may be an electrically driven device, such as an actuator or a lens actuator having an associated controller. An actuator may refer to a suitable mechanical device configured to move or control another device. The hardware mechanism 112 may be configured to drive the adaptive optic such that the adaptive optic effectively shifts the projected pixels by a fractional offset from a base position. The hardware mechanism 112 may be configured to drive the adaptive optic in various preconfigured configurations such that the adaptive optic effectively shifts the projected pixels to preconfigured positions relative to the base position. Alternatively, the hardware mechanism 112 may be configured to drive the adaptive optic in various arbitrary configurations such that the adaptive optic effectively shifts the projected pixels to arbitrary positions relative to the base position. The hardware mechanism 112 may be configured to drive the adaptive optic to effectively shift the projected pixels prior to the video processing module 116 generating each successive frame. In this way, successive frames may have different fractional pixel offsets.

Some examples of adaptive optics may include a deformable mirror, a liquid crystal array, or other suitable variable phase element. The hardware mechanism 112 may be configured to drive the adaptive optic by adapting properties of the variable phase element. For example, the hardware mechanism 112 may be configured to change the shape of the deformable mirror or change the refractive index of the liquid crystal array. By changing the shape of the deformable mirror or changing the refractive index of the liquid crystal array, the hardware mechanism 112 may be configured to effectively adapt the light in such a way to shift the projected pixels on the focal plane array 114 by a fractional offset.

Since the shift magnification can be adjusted by the hardware mechanism 112, the sub-pixel shift parameters may be planned or adaptively adjusted for optimal reconstruction performance. For example, if the video camera 100 detects a scene that is stationary, the hardware mechanism 112 may shift the successive frames in a more regularized way. In this case, a simple reconstruction approach can be applied. When the camera detects the scene that is shaking (i.e., a dynamic scene), the hardware mechanism 112 may shift the frames in a more random way. In this case, a more advanced reconstruction approach can be used to achieve a better performance. The reason is that under certain circumstances, the more advanced reconstruction approach may be better for irregularly sampled frames, but the computation load may be much higher than the simple reconstruction approaches.

Figure 2:
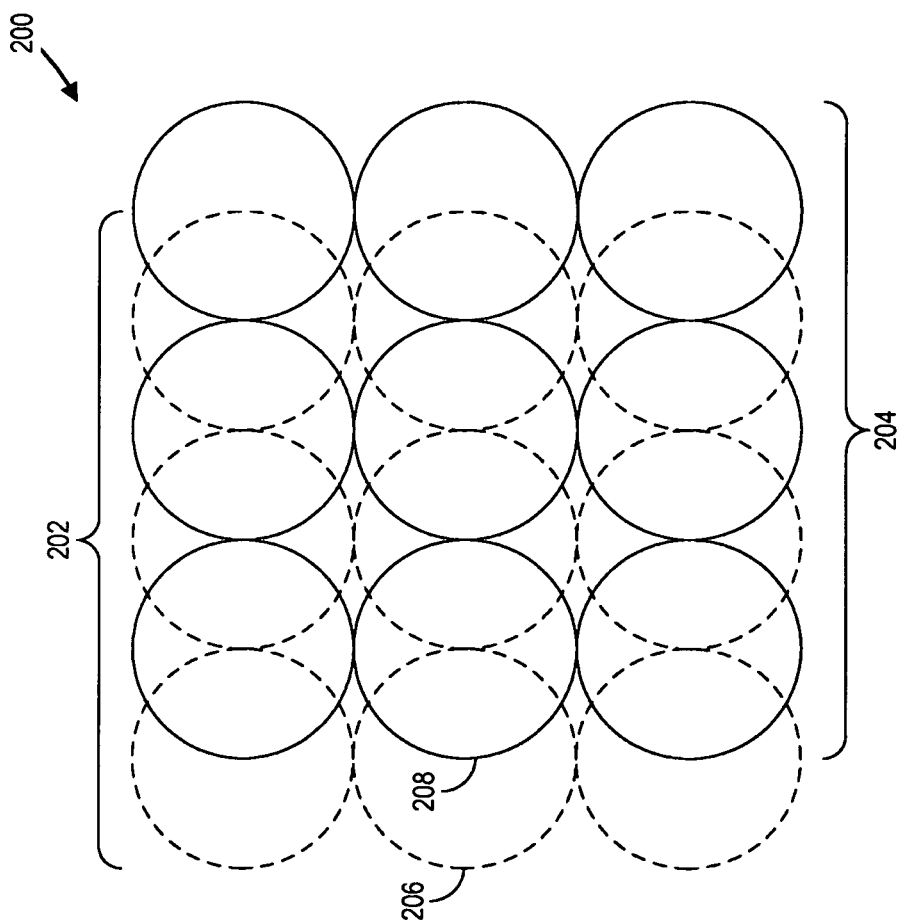
FIG. 2 is a diagram illustrating an enlarged, cross-sectional portion of two example superimposed frames.

FIG. 2 is a diagram illustrating an enlarged, cross-sectional portion 200 of two example superimposed frames, arranged in accordance with at least some embodiments presented herein. According to various embodiments, the video processing module 116 may be configured to generate the video 118 by capturing a series of successive frames. Each of the frames may contain pixels superimposed over a field-of-view. The field-of-view may refer to the portion of a visual scene that is captured through the multi-element lens 102. The cross-sectional portion 200 may include a first array of projected pixels 202 from a first frame and a second array of shifted projected pixels 204 from a second frame. The first frame and the second frame may be successive frames in the video 118.

FIG. 2 may illustrate the first array of projected pixels 202 in dashed lines and the second array of shifted projected pixels 204 in solid lines. The first array of projected pixels 202 may include nine pixels, such as a pixel 206. The second array of shifted projected pixels 204 may also include nine pixels, such as a pixel 208. It should be appreciated that the pattern of pixels illustrated in FIG. 2 is merely an example of some focal plane arrays utilized on video cameras. The technologies described herein may also be implemented on video cameras having focal plane arrays that project various other patterns of pixels, in accordance with various embodiments. For example, patterns of pixels may differ between single-chip CCD and CMOS sensor arrays and multi-chip CCD and CMOS sensor arrays.

In an illustrative application of the video camera 100, the pixel shifting mechanism 110 may initially be configured in a base configuration. When the pixel shifting mechanism 110 is in the base configuration, the video processing module 116 may be configured to capture, via the focal plane array 114 and the multi-element lens 102, the first frame having the first array of projected pixels 202. Prior to the video processing module 116 capturing the second frame, the hardware mechanism 112 may be configured to drive the pixel shifting mechanism 110 from the base configuration to a first shifted configuration. The first shifted configuration may be a preprogrammed configuration or an arbitrary configuration. When the pixel shifting mechanism 110 is in the first shifted configuration, the video processing module 116 may be configured to capture, via the focal plane array 114 and the multi-element lens 102, the second frame having the second array of shifted projected pixels 204. That is, the first shifted configuration may be designed to effectively shift the position of projected pixels relative to the base position. In the example illustrated in FIG. 2, the pixels in the second array of shifted projected pixels 204 in the second frame have been shifted by one-half pixel horizontally and to the right relative to the pixels in the first array of projected pixels 202. For example, the pixel 208 in the second frame may correspond to the pixel 206 in the first frame. In other examples, the pixels may be shifted by any suitable distance less than one pixel relative to the base position and/or any suitable direction from the base position, thereby creating shifted, overlapping projected pixels between multiple frames.

When the video processing module 116 captures the second frame, the video processing module 116 may be configured to continue capturing additional frames. Prior to the video processing module 116 capturing each additional frame, the hardware mechanism 112 may be configured to drive the pixel shifting mechanism 110 back to the base configuration or to one or more other shifted configurations. These other shifted configurations may be preprogrammed configurations, arbitrary configurations, or adaptive configurations that are adapted according to a dynamic scene. In some embodiments, the hardware mechanism 112 may be configured to drive the pixel shifting mechanism 110 such that projected pixels on the focal plane array 114 are shifted parallel to a conjugate image plane defined by the focal plane array 114. In some other embodiments, the hardware mechanism 112 may be configured to drive the pixel shifting mechanism 110 such that projected pixels on the focal plane array 114 are shifted angularly with respect to the conjugate image plane. The various configurations may be designed such that pixels are effectively shifted in multiple directions relative to the base position. In this way, multiple frames can have shifted, overlapping projected pixels.

In some embodiments, preprogrammed configurations may include a base configuration corresponding to projected pixels in a base position, a first shifted configuration corresponding to projected pixels in a first shifted position that is fractionally offset horizontally and to the right of the pixels in the base position, a second shifted configuration corresponding to projected pixels in a second shifted position that is fractionally offset horizontally and to the left of the pixels in the base position, a third shifted configuration corresponding to projected pixels in a third shifted position that is fractionally offset vertically and up from the pixels in the base position, and a fourth shifted configuration corresponding to projected pixels in a fourth shifted position that is fractionally offset vertically and down from the pixels in the base position. In such embodiments, the hardware mechanism 112 may be configured to drive the pixel shifting mechanism 110 between the base configuration, the first shifted configuration, the second shifted configuration, the third shifted configuration, and the fourth shifted configuration as the video processing module 116 captures each continuous series of five successive frames. Other embodiments may utilize other preprogramed configurations and/or arbitrary configurations.

Figure 3:
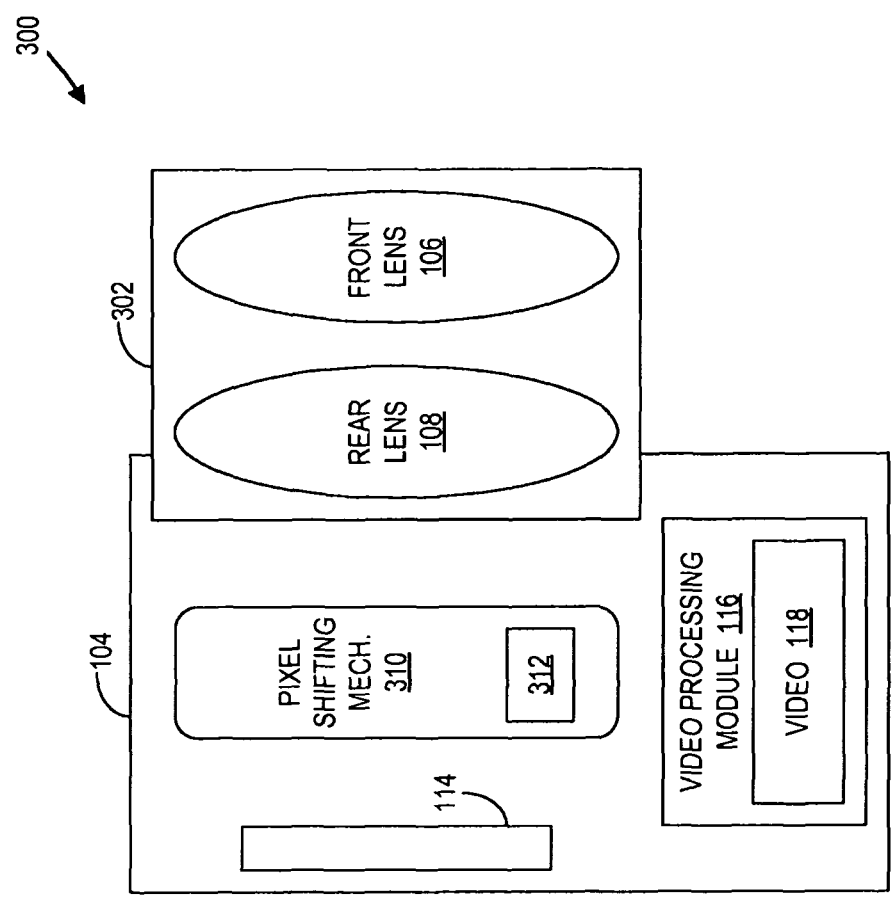
FIG. 3 is a functional block diagram illustrating an example video camera adapted to generate a higher resolution still frame.

FIG. 3 is a functional block diagram illustrating an example video camera 300 adapted to generate a higher resolution still frame, arranged in accordance with at least some embodiments presented herein. The video camera 300 may include the multi-element lens 302 and the video camera housing 104 coupled to the multi-element lens 302. The multi-element lens 302 may include the front lens 106 and the rear lens 108. The video camera housing 104 may include the focal plane array 114 and the video processing module 116. The video camera housing 104 may further include a pixel shifting mechanism 310 positioned between the focal plane array 114 and the multi-element lens 302. The video camera housing 104 may also include a hardware mechanism 312 coupled to the pixel shifting mechanism 310.

In some embodiments, the pixel shifting mechanism 310 may be an adaptive optic, such as plain glass. The hardware mechanism 312 may be configured to drive the adaptive optic in order to change a shift magnification of the multi-element lens 302 from multiple pixels to fractional pixels. By changing the shift magnification of the multi-element lens 302 from multiple pixels to fractional pixels, the adaptive optic may effectively shift projected pixels on the focal plane array 114 by a fractional offset of less than one pixel. The hardware mechanism 312 may be configured to drive the adaptive optic in various configurations in order to effectively shift projected pixels in multiple directions relative to a base position.

In some embodiments, the hardware mechanism 312 may be an electrically driven device, such as a microactuator having an associated controller. The hardware mechanism 312 may be configured to drive the adaptive optic such that the adaptive optic effectively shifts the projected pixels by a fractional offset from a base position. The hardware mechanism 312 may be configured to drive the adaptive optic in various preconfigured configurations such that the adaptive optic effectively shifts the projected pixels to preconfigured positions relative to the base position. Alternatively, the hardware mechanism 312 may be configured to drive the adaptive optic in various arbitrary configurations such that the adaptive optic effectively shifts the projected pixels to arbitrary positions relative to the base position. The hardware mechanism 312 may be configured to drive the adaptive optic to effectively shift the projected pixels prior to the video processing module 116 generating each successive frame. In this way, successive frames may have different fractional pixel offsets.

Figure 4:
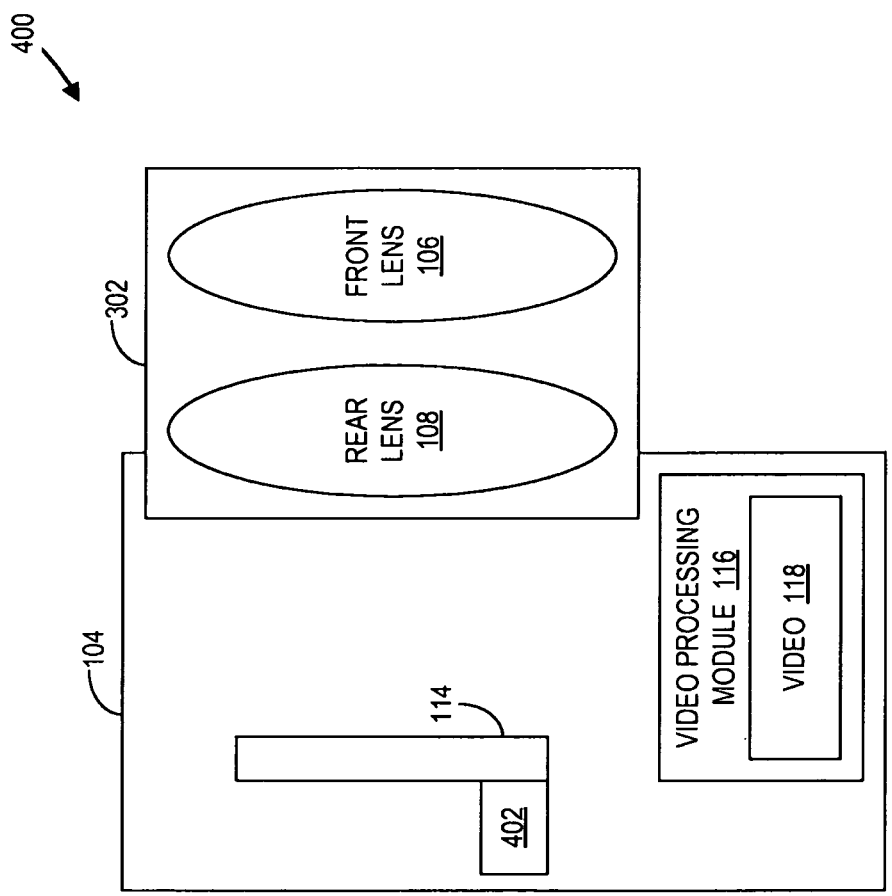
FIG. 4 is a functional block diagram illustrating an example video camera adapted to generate a higher resolution still frame.

FIG. 4 is a functional block diagram illustrating an example video camera 400 adapted to generate a higher resolution still frame, arranged in accordance with at least some embodiments presented herein. The video camera 400 may include the multi-element lens 302 and the video camera housing 104 coupled to the multi-element lens 302. The multi-element lens 302 may include the front lens 106 and the rear lens 108. The video camera housing 104 may include the focal plane array 114 and the video processing module 116. The video camera housing 104 may further include a hardware mechanism 402 coupled to the focal plane array 114.

The hardware mechanism 402 may be configured to adjust the position of the focal plane array 114 relative to a base position in order to shift projected pixels on the focal plane array 114 by a fractional offset of less than one pixel. The hardware mechanism 402 may be configured to adjust the position of the adaptive optic in various configurations in order to shift projected pixels on the focal plane array 114 in multiple directions. In some embodiments, the hardware mechanism 402 may be an electrically driven device, such as a microactuator having an associated controller. The hardware mechanism 402 may be configured to adjust the position of the focal plane array 114 in various preconfigured positions relative to a base position. Alternatively, the hardware mechanism 402 may be configured to adjust the position of the focal plane array 114 in various arbitrary positions relative to a base position. The hardware mechanism 312 may be configured to adjust the position of the focal plane array 114 to another position prior to the video processing module 116 generating each successive frame. In this way, successive frames may have different fractional pixel offsets.

It should be appreciated that the configurations of the hardware mechanisms illustrated in FIG. 1, FIG. 2, and FIG. 4 are merely illustrative and that other configurations may be contemplated by one skilled in the art. For example, for a double lens camera as illustrated in FIGS. 1, 3, and 4, the pixel shifting mechanisms 110, 310 may be arranged in at least three different locations: in front of the lens (not shown), between front lens and rear lens (FIG. 1), and between the lenses and the focal plane (FIG. 3). For a single lens camera, the pixel shifting mechanism 110, 310 may be arranged in at least two locations: behind the lens and between the lens and the focal plane.

There are at least three ways to achieve pixel shifting. One way is illustrated in FIG. 4, where the focal plane is shifted directly by actuators (i.e., a pure mechanical design). Two other ways may include a mechanical-optical system, as illustrated in FIGS. 1 and 3, where a flat, thin transparent plate or adaptive optics may be utilized to shift. One way is shifting the sampling grid horizontally and vertically. Another way is shifting by an angular variation, which is of the order of the sub-pixel size. Because the displacement is very small relative to the focal length, the change of the optical path length may result in a negligible effect on the focus. In some embodiments, the pixel shifting mechanism may be configured to instantaneously (i.e., as fast as possible) make the shift between temporal integration periods of two successive frames. This can ensure that the shifting processing does not cause additional motion blurs.

Figure 5:
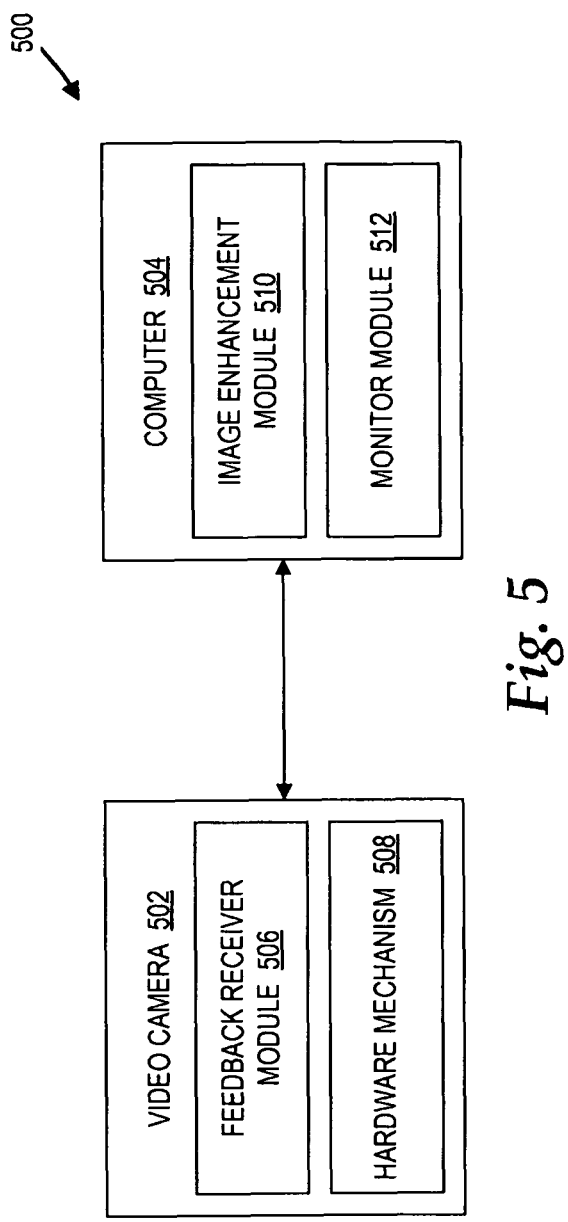
FIG. 5 is a functional block diagram illustrating an example feedback system adapted to determine pixel offsets based on feedback.

FIG. 5 is a functional block diagram illustrating an example feedback system 500 adapted to determine pixel offsets based on feedback, arranged in accordance with at least some embodiments presented herein. The feedback system 500 may include a video camera 502 and a computer 504 coupled to the video camera 502. The video camera 502 may include a feedback receiver module 506 and a hardware mechanism 508. Some examples of the video camera 502 may include the video cameras 100, 300, 400. Some examples of the hardware mechanism 508 may include the hardware mechanisms 112, 312, 402. The computer 504 may include an image enhancement module 510 and a monitor module 512. In some embodiments, the computer 504 may be an external computing device separate from the video camera 502. In some other embodiments, the computer 504 may be an internal computing device integrated within the video camera 502. The video camera 502 and computer 504 may be coupled via a wired or wireless connection.

The image enhancement module 510 may be configured to generate a high resolution image based on multiple frames captured by the video camera 502. The image enhancement module 510 may utilize various image enhancement techniques to generate the high resolution image. Such image enhancement techniques may utilize the shifted, overlapping pixels across multiple frames in the video 118. In some examples of image enhancement techniques, the image enhancement module 510 may be configured to generate a high resolution image by computing linear combinations of shifted, overlapping pixels across multiple frames. In some other examples of other image enhancement techniques, the image enhancement module 510 may be configured to generate a high resolution image by interleaving raw pixel values of shifted, overlapping pixels across multiple frames.

The monitor module 512 may be configured to monitor operation of image enhancement module 510. In some embodiments, the monitor module 512 may be configured to monitor the quality of the high resolution image generated by the image enhancement module 510. The monitor module 512 may provide, to the feedback receiver module 506, feedback indicating whether the quality of the high resolution image meets a minimum threshold. In some embodiments, the feedback may include instructions for changing, adding, and/or removing various configurations of the pixel shifting mechanism 110, the pixel shifting mechanism 310, or the focal plane array 114 facilitated by the hardware mechanism 508. In these cases, the feedback receiver module 506 may be configured to receive the instructions from the monitor module 512 and then provide the instructions to the hardware mechanism 508, which can then execute the instructions. In some other embodiments, the feedback may include relevant data regarding the high resolution image generated by the image enhancement module 510. In these cases, the feedback receiver module 506 may be configured to receive the relevant data and then determine instructions for changing, adding, and/or removing various configurations of the pixel shifting mechanism 110, the pixel shifting mechanism 310, or the focal plane array 114 facilitated by the hardware mechanism 508. The feedback receiver module 506 may then be configured to provide the instructions to the hardware mechanism 508, which can then execute the instructions.

Figure 6:
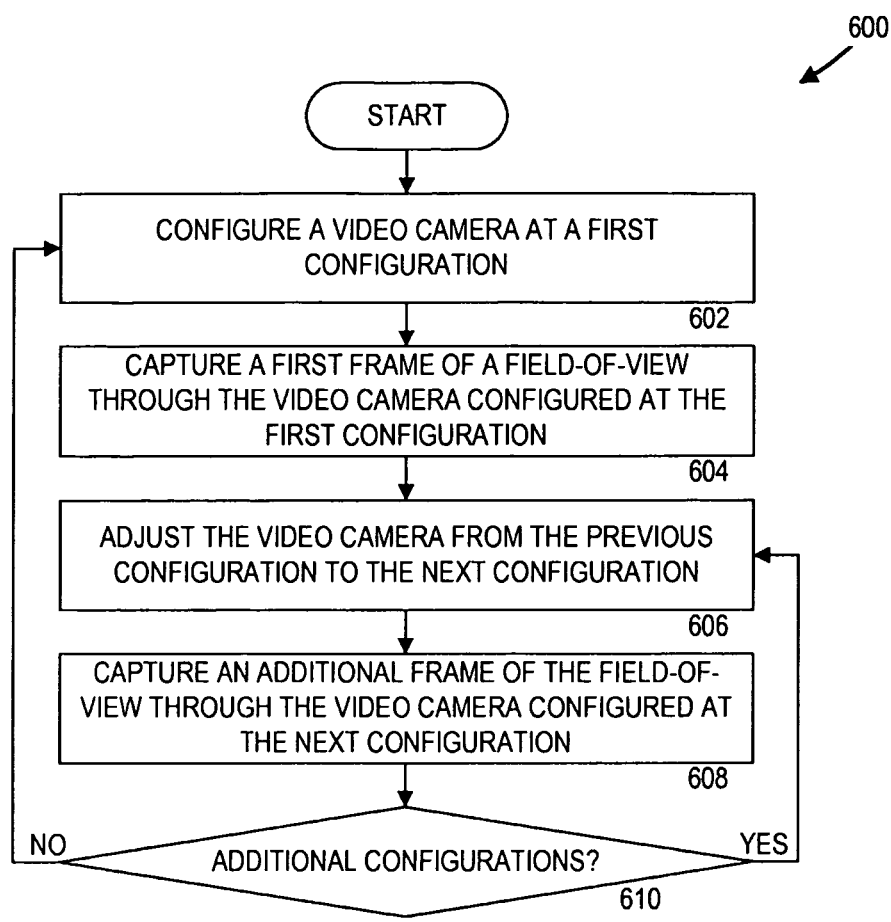
FIG. 6 is a flow diagram illustrating an example process adapted to generate a higher resolution still frame.

FIG. 6 is a flow diagram illustrating an example process 600 adapted to generate a higher resolution still frame, arranged in accordance with at least some embodiments presented herein. The process 600 may include various operations, functions, or actions as illustrated by one or more blocks 602 through 610.

The process 600 may begin at block 602 (Configure a Video Camera at a First Configuration), where a hardware mechanism may be adapted to configure a video camera at a first configuration. Some examples of the hardware mechanism may include the hardware mechanisms 112, 312, 402, 508. Some examples of the video camera may include the video cameras 100, 300, 400, 502. The first configuration may be a default configuration of the video camera. In some embodiments, the default configuration may refer to a default configuration of a pixel shifting mechanism, such as the pixel shifting mechanisms 110, 310. In some other embodiments, the default configuration may refer to a base position of a focal plane array, such as the focal plane array 114. Block 602 may be followed by block 604.

At block 604 (Capture a First Frame of a Field-of-View Through the Video Camera Configured at the First Configuration), a video processing module, such as the video processing module 116, may be adapted to capture a first frame of a field-of-view through the video camera configured at the first configuration. The video processing module may be configured to capture the first frame by processing light received via the multi-element lens and the focal plane array. The first frame may include an array of pixels, such as the first array of projected pixels 202. Block 604 may be followed by block 606.

At block 606 (Adjust the Video Camera from the Previous Configuration to the Next Configuration), the hardware mechanism may be adapted to adjust the video camera from the previous configuration (e.g., the first configuration) to the next configuration (e.g., the second configuration). In some embodiments, the next configuration may refer to a preprogrammed configuration. In some other embodiments, the next configuration may refer an arbitrary configuration.

In some embodiments, the hardware mechanism may be configured to drive the pixel shifting mechanism from the previous configuration to the next configuration. Adjusting the pixel shifting mechanism from the previous configuration to the next configuration may change a shift magnification of the multi-element lens from multiple pixels to fractional pixels. By changing the shift magnification of the multi-element lens from multiple pixels to fractional pixels, the pixel shifting mechanism may effectively shift projected pixels on the focal plane array by a fractional offset of less than one pixel. In some implementations, the pixel shifting mechanism, such as the pixel shifting mechanism 110, may be arranged between two lenses in a multi-element lens. In some other implementations, the pixel shifting mechanism, such as the pixel shifting mechanism 310, may be arranged in the video camera housing 104 and positioned between the focal plane array 114 and the multi-element lens 302. In yet other implementations, the pixel shifting mechanism may be arranged in any suitable location within the video camera such that projected pixels on the focal plane array are shifted by a fractional offset.

In some other embodiments, the hardware mechanism may be configured to adjust the position of the focal plane array from the previous position associated with the previous configuration to the next position associated with the next configuration. Adjusting the position of the focal plane array from the previous configuration to the next configuration may also shift projected pixels on the focal plane array by a fractional offset of less than one pixel. Block 606 may be followed by block 608.

At block 608 (Capture an Additional Frame of the Field-of-View Through the Video Camera Configured at the Next Configuration), the video processing module may be adapted to capture an additional frame of the field-of-view through the video camera configured at the next configuration. The second frame may include an array of pixels, such as the second array of projected pixels 204, which have been shifted relative to the array of pixels in the first frame. Block 608 may be followed block 610.

At block 610 (Additional Configurations?), the hardware mechanism may be configured to determine whether it is configured to further adjust the video camera to additional configurations. For example, the video camera may be configured to adjust the video camera between five configurations: a base configuration, a first configuration, a second configuration, a third configuration, and a fourth configuration. If the hardware mechanism determines that it is configured to further adjust the video camera to additional configurations, then block 610 may be followed by block 606. Blocks 606-610 may be repeated until the hardware mechanism determines that it has adjusted the video camera to the available configurations. If the hardware mechanism determines that it has adjusted the video camera to the available configurations, then block 610 may be followed by block 602. Blocks 602-610 may be repeated, as necessary, while the video camera is in operation. The process 600 may either repeat (e.g., periodically, continuously, or on demand as needed) or terminate.

Figure 7:
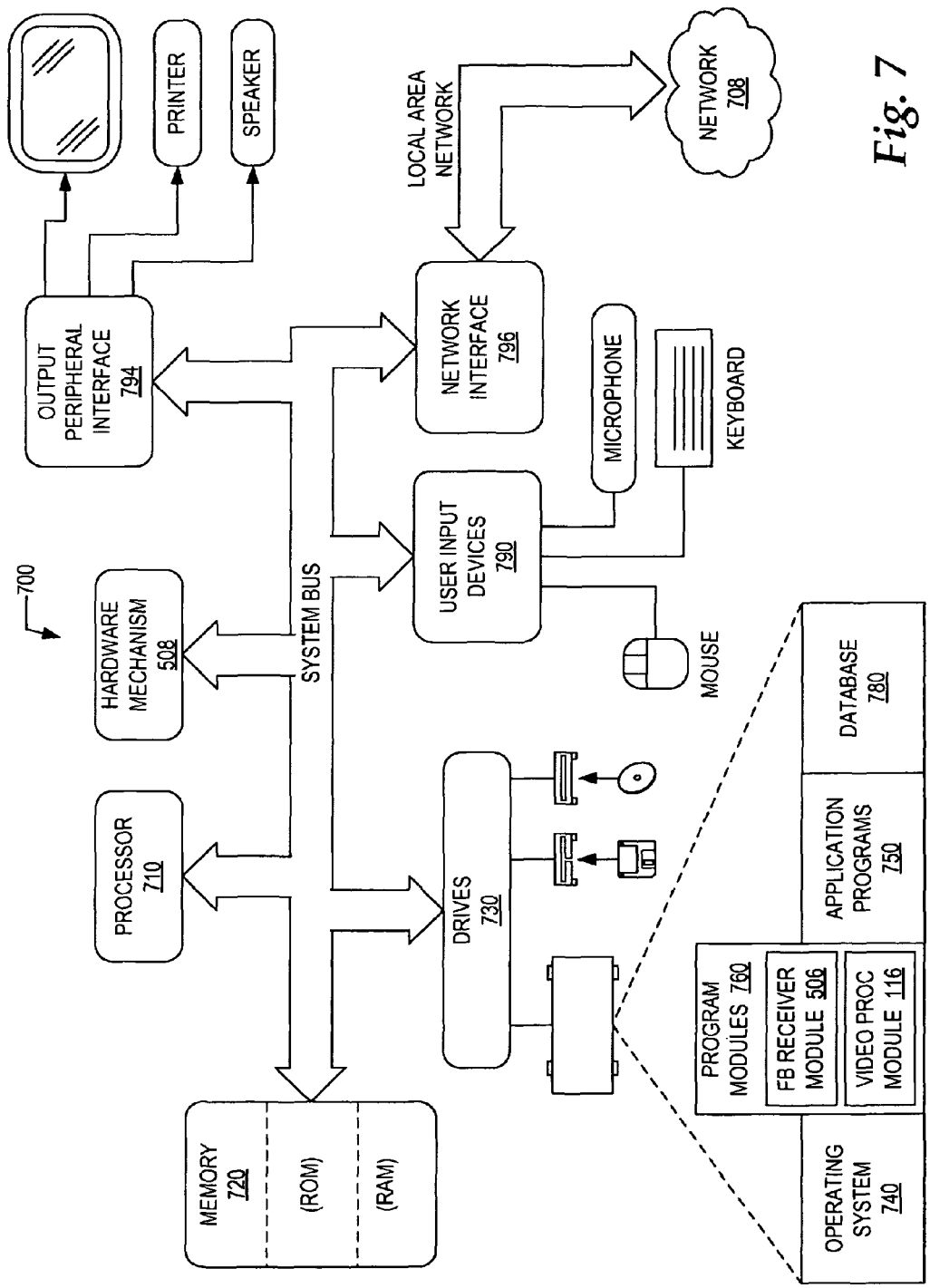
FIG. 7 is a block diagram illustrating a computer hardware architecture for an example computing system.

FIG. 7 is a block diagram illustrating a computer hardware architecture for an example computing system, arranged in accordance with at least some embodiments presented herein. FIG. 7 includes a computer 700, including a processor 710, memory 720, and one or more drives 730. The computer 700 may further include the hardware mechanism 508. The computer 700 may be implemented as a conventional computer system, an embedded control computer, a laptop, or a server computer, a mobile device, a set-top box, a kiosk, a vehicular information system, a mobile telephone, a customized machine, or other hardware platform. The computer 700 may also be implemented as a video camera, such as the video cameras 100, 300, 400, 502.

The drives 730 and their associated computer storage media, provide storage of computer readable instructions, data structures, program modules and other data for the computer 700. The drives 730 can include an operating system 740, application programs 750, program modules 760, and a database 780. The program modules 760 may include the feedback receiver module 506 and the video processing module 116. The computer 700 further includes user input devices 790 through which a user may enter commands and data. Input devices can include an electronic digitizer, a microphone, a keyboard and pointing device, commonly referred to as a mouse, trackball or touch pad. Other input devices may include a joystick, game pad, satellite dish, scanner, or the like.

These and other input devices can be coupled to the processor 710 through a user input interface that is coupled to a system bus, but may be coupled by other interface and bus structures, such as a parallel port, game port or a universal serial bus ("USB"). Computers such as the computer 700 may also include other peripheral output devices such as speakers, which may be coupled through an output peripheral interface 794 or the like.

The computer 700 may operate in a networked environment using logical connections to one or more computers, such as a remote computer coupled to a network interface 796. The remote computer may be a personal computer, a server, a router, a network PC, a peer device or other common network node, and can include many or all of the elements described above relative to the computer 700. Networking environments are commonplace in offices, enterprise-wide area networks ("WAN"), local area networks ("LAN"), intranets, and the Internet.

When used in a LAN or WLAN networking environment, the computer 700 may be coupled to the LAN through the network interface 796 or an adapter. When used in a WAN networking environment, the computer 700 typically includes a modem or other means for establishing communications over the WAN, such as the Internet or the network 708. The WAN may include the Internet, the illustrated network 708, various other networks, or any combination thereof. It will be appreciated that other mechanisms of establishing a communications link, ring, mesh, bus, cloud, or network between the computers may be used.

According to some embodiments, the computer 700 may be coupled to a networking environment. The computer 700 may include one or more instances of a physical computer-readable storage medium or media associated with the drives 730 or other storage devices. The system bus may enable the processor 710 to read code and/or data to/from the computer-readable storage media. The media may represent an apparatus in the form of storage elements that are implemented using any suitable technology, including but not limited to semiconductors, magnetic materials, optical media, electrical storage, electrochemical storage, or any other such storage technology. The media may represent components associated with memory 720, whether characterized as RAM, ROM, flash, or other types of volatile or nonvolatile memory technology. The media may also represent secondary storage, whether implemented as the storage drives 730 or otherwise.

Hard drive implementations may be characterized as solid state, or may include rotating media storing magnetically-encoded information.

The storage media may include one or more program modules 760. The program modules 760 may include software instructions that, when loaded into the processor 710 and executed, transform a general-purpose computing system into a special-purpose computing system. As detailed throughout this description, the program modules 760 may provide various tools or techniques by which the computer 700 may participate within the overall systems or operating environments using the components, logic flows, and/or data structures discussed herein.

The processor 710 may be constructed from any number of transistors or other circuit elements, which may individually or collectively assume any number of states. More specifically, the processor 710 may operate as a state machine or finite-state machine. Such a machine may be transformed to a second machine, or specific machine by loading executable instructions contained within the program modules 760. These computer-executable instructions may transform the processor 710 by specifying how the processor 710 transitions between states, thereby transforming the transistors or other circuit elements constituting the processor 710 from a first machine to a second machine. The states of either machine may also be transformed by receiving input from the one or more user input devices 790, the network interface 796, other peripherals, other interfaces, or one or more users or other actors. Either machine may also transform states, or various physical characteristics of various output devices such as printers, speakers, video displays, or otherwise.

Encoding the program modules 760 may also transform the physical structure of the storage media. The specific transformation of physical structure may depend on various factors, in different implementations of this description. Examples of such factors may include, but are not limited to: the technology used to implement the storage media, whether the storage media are characterized as primary or secondary storage, and the like. For example, if the storage media are implemented as semiconductor-based memory, the program modules 760 may transform the physical state of the semiconductor memory 720 when the software is encoded therein. For example, the software may transform the state of transistors, capacitors, or other discrete circuit elements constituting the semiconductor memory 720.

As another example, the storage media may be implemented using magnetic or optical technology such as drives 730. In such implementations, the program modules 760 may transform the physical state of magnetic or optical media, when the software is encoded therein. These transformations may include altering the magnetic characteristics of particular locations within given magnetic media. These transformations may also include altering the physical features or characteristics of particular locations within given optical media, to change the optical characteristics of those locations. It should be appreciated that various other transformations of physical media are possible without departing from the scope and spirit of the present description.

Figure 8A:
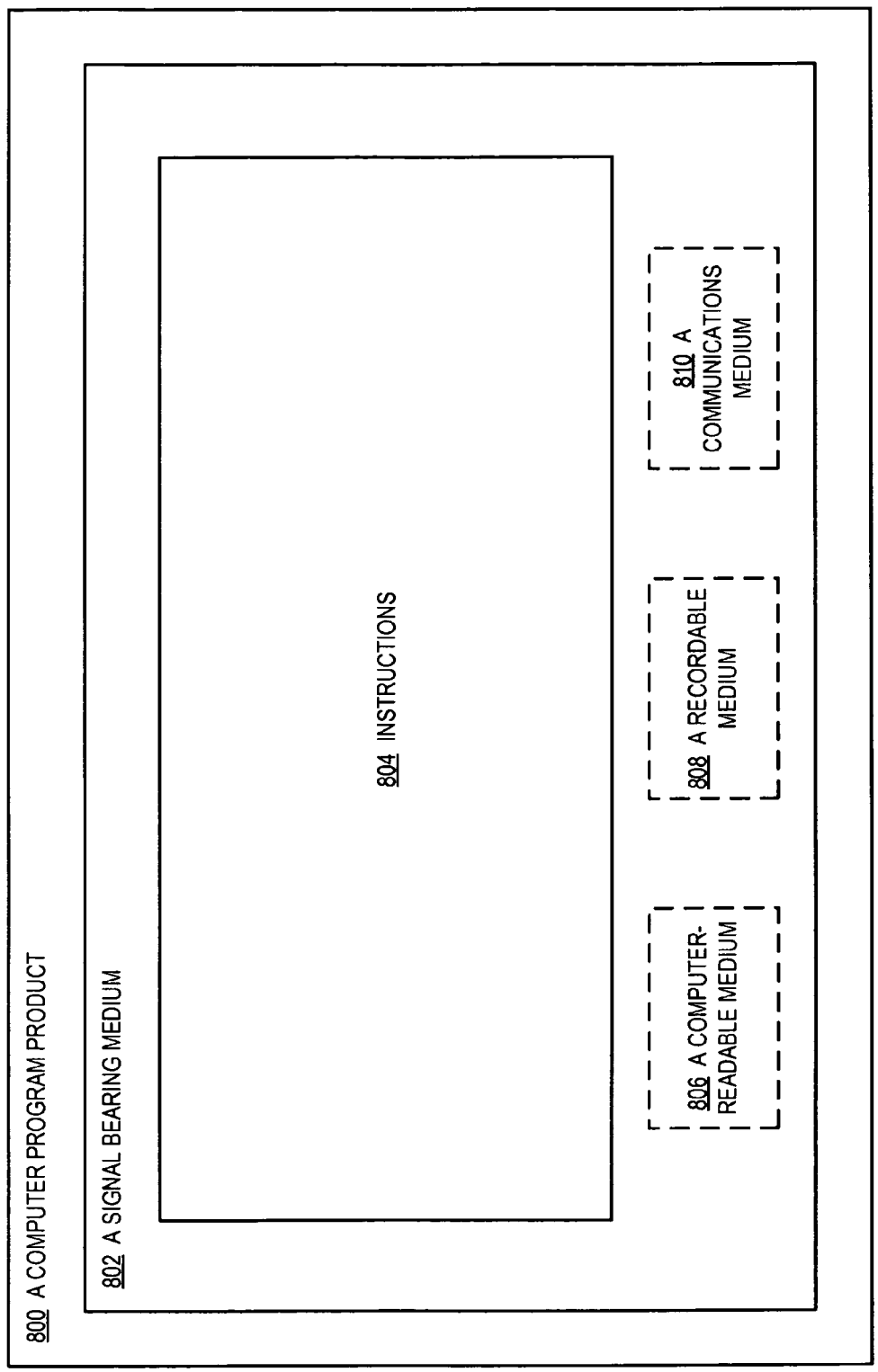

FIGS. 8A-8B are schematic diagrams that illustrate a computer program product 800 that includes a computer program for executing a computer process on a computing device, arranged in accordance with at least some embodiments presented herein. An illustrative embodiment of the example computer program product is provided using a signal bearing medium 802, and may include at least one instruction of 804: one or more instructions for configuring a video camera at a first configuration, the first configuration adapting the video camera to capture video at a first pixel offset; one or more instructions for capturing a first frame of a field-of-view through the video camera configured at the first configuration, the first frame containing the field-of-view captured at the first pixel offset; one or more instructions for adjusting the video camera from the first configuration to a second configuration, the second configuration adapting the video camera to capture the video at a second pixel offset, the adjustment using a hardware mechanism; or one or more instructions for capturing a second frame of the field-of-view through the video camera configured at the second configuration, the second frame containing the field-of-view captured at the second pixel offset. In some embodiments, the signal bearing medium 802 of the one or more computer program products 800 include a computer readable medium 806, a recordable medium 808, and/or a communications medium 810.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multi-core processor systems, microprocessor based or programmable consumer electronics, minicomputers, mainframe computers, and the like.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 elements refers to groups having 1, 2, or 3 elements. Similarly, a group having 1-5 elements refers to groups having 1, 2, 3, 4, or 5 elements, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method to generate a higher resolution still frame, comprising:
    configuring a video camera to capture a video that includes successive video frames captured by alternating between a first configuration of the video camera and a second configuration of the video camera, the first configuration adapting the video camera to capture video at a first pixel offset and the second configuration adapting the video camera to capture the video at a second pixel offset;
    capturing a first frame of a field-of-view through the video camera configured at the first configuration, the first frame containing the field-of-view captured at the first pixel offset;
    upon capturing the first frame of the field-of-view through the video camera, adjusting the video camera from the first configuration to the second configuration, the adjustment using a hardware mechanism; and
    upon adjusting the video camera from the first configuration to the second configuration, capturing a second frame of the field-of-view through the video camera configured at the second configuration, the second frame containing the field-of-view captured at the second pixel offset.

2. The method of claim 1, further comprising integrating the first frame and the second frame to generate the higher resolution still frame.

3. The method of claim 1, wherein adjusting the video camera from the first configuration to the second configuration comprises driving an adaptive optic arranged between two lenses within a multi-element lens of the video camera, wherein the adaptive optic is driven to shift a position of projected pixels on a focal plane array of the video camera from the first pixel offset to the second pixel offset.

4. The method of claim 3, wherein the adaptive optic comprises plain glass.

5. The method of claim 3, wherein the adaptive optic is electrically driven by operating the hardware mechanism on the video camera.

6. The method of claim 5, wherein the hardware mechanism comprises a microactuator configured to drive the adaptive optic.

7. The method of claim 5, wherein the hardware mechanism drives the adaptive optic in a predetermined configuration from the first configuration to the second configuration.

8. The method of claim 5, wherein the hardware mechanism drives the adaptive optic in an arbitrary configuration from the first configuration to the second configuration.

9. The method of claim 1, wherein adjusting the video camera from the first configuration to the second configuration comprises adjusting a focal plane array contained in the video camera, wherein the focal plane array is adjusted to shift a position of projected pixels on the focal plane array from the first pixel offset to the second pixel offset.

10. The method of claim 9, wherein the focal plane array comprises a charged coupled device (CCD) sensor array or a complementary metal oxide semiconductor (CMOS) sensor array.

11. The method of claim 9, wherein the focal plane array is electrically adjusted by operating the hardware mechanism on the video camera.

12. The method of claim 1, wherein adjusting the video camera from the first configuration to the second configuration comprises driving an adaptive optic arranged between a focal plane array and a multi-element lens of the video camera, wherein the adaptive optic is driven to shift a position of projected pixels on the focal plane array of the video camera from the first pixel offset to the second pixel offset.

13. The method of claim 12, wherein the adaptive optic is electrically driven by operating the hardware mechanism on the video camera.

14. The method of claim 1, wherein a difference between the first pixel offset and the second pixel offset is less than one pixel.

15. The method of claim 1, wherein adjusting the video camera from the first configuration to the second configuration comprises:
receiving feedback from a computer coupled to the video camera;
determining the second pixel offset based on the feedback from the computer;
determining the second configuration that causes the video camera to capture the video at the second pixel offset; and
adjusting the video camera from the first configuration to the second configuration.

16. A video camera, comprising:
a multi-element lens;
a focal plane array coupled to the multi-element lens; and
a hardware mechanism adapted to configure the video camera to
capture a video that includes successive video frames captured by alternation between a first configuration of the video camera and a second configuration of the video camera, wherein the first configuration adapts the video camera to capture video at a first pixel offset and the second configuration adapts the video camera to capture the video at a second pixel offset;
capture a first frame of a field-of-view through the video camera configured at the first configuration, wherein the first frame contains the field-of-view captured at the first pixel offset;
upon capture of the first frame of the field-of-view through the video camera, adjust the video camera from the first configuration to the second configuration; and
upon adjustment of the video camera from the first configuration to the second configuration, capture a second frame of the field-of-view through the video camera configured at the second configuration, wherein the second frame contains the field-of-view captured at the second pixel offset.

17. The video camera of claim 16, wherein the multi-element lens comprises an adaptive optic arranged between two lenses in the multi-element lens; and wherein the hardware mechanism is adapted to electrically drive the adaptive optic such that a position of projected pixels on the focal plane array is shifted from the first pixel offset to the second pixel offset.

18. The video camera of claim 17, wherein the adaptive optic comprises plain glass.

19. The video camera of claim 17, wherein the hardware mechanism comprises a microactuator and a controller coupled to the microactuator.

20. The video camera of claim 16, wherein the hardware mechanism is adapted to electrically adjust the focal plane array such that a position of projected pixels on the focal plane array is shifted from the first pixel offset to the second pixel offset.

21. The video camera of claim 16, further comprising an adaptive optic arranged between the focal plane array and the multi-element lens; and wherein the hardware mechanism is adapted to electrically drive the adaptive optic such that a position of projected pixels on the focal plane array is shifted from the first pixel offset to the second pixel offset.

22. The video camera of claim 16, wherein the focal plane array comprises a charged coupled device (CCD) sensor array or a complementary metal oxide semiconductor (CMOS) sensor array.

23. The video camera of claim 16, wherein a difference between the first pixel offset and the second pixel offset is less than one pixel.

24. A non-transitory computer-readable storage medium having computer-executable instructions stored thereon which, when executed by a computer, cause the computer to:
configure a video camera to capture frames of a video using different configurations that includes a default configuration, a first configuration, a second configuration, a third configuration and a fourth configuration, the default configuration adapting the video camera to capture video at a default pixel offset;
capture a first frame of a field-of-view through the video camera configured at the default configuration, the first frame containing the field-of-view captured at the default pixel offset;
operate a hardware mechanism on the video camera to shift the video camera from the default configuration to a first configuration, the first configuration adapting the video camera to capture the video at a first pixel offset;
capture a second frame of the field-of-view through the video camera configured at the first configuration, the second frame containing the field-of-view captured at the first pixel offset, the second frame immediately succeeding the first frame;
operate the hardware mechanism on the video camera to shift the video camera from the first configuration to a second configuration, the second configuration adapting the video camera to capture the video at a second pixel offset;
capture a third frame of the field-of-view through the video camera configured at the second configuration, the third frame containing the field-of-view captured at the second pixel offset, the third frame immediately succeeding the second frame;
operate the hardware mechanism on the video camera to shift the video camera from the second configuration to a third configuration, the third configuration adapting the video camera to capture the video at a third pixel offset;
capture a fourth frame of the field-of-view through the video camera configured at the third configuration, the fourth frame containing the field-of-view captured at the third pixel offset, the fourth frame immediately succeeding the third frame;
operate the hardware mechanism on the video camera to shift the video camera from the third configuration to a fourth configuration, the fourth configuration adapting the video camera to capture the video at a fourth pixel offset;
capture a fifth frame of the field-of-view through the video camera configured at the fourth configuration, the fifth frame containing the field-of-view captured at the fourth pixel offset, the fifth frame immediately succeeding the fourth frame; and
generate a higher resolution still frame by integrating the first frame, the second frame, the third frame, the fourth frame, and the fifth frame.

25. The non-transitory computer-readable storage medium of claim 24, wherein the first pixel offset and the second pixel offset comprise offsets on each side of a horizontal plane with respect to the default pixel offset; and wherein the third pixel offset and the fourth pixel offset comprise offsets on each side of a vertical plane with respect to the default pixel offset.

* * * * *

UNITED STATES PATENT AND TRADEMARK OFFICE
CERTIFICATE OF CORRECTION

PATENT NO.        : 8,941,751 B2                                Page 1 of 1
APPLICATION NO.   : 13/264236
DATED             : January 27, 2015
INVENTOR(S)       : Leung et al.

It is certified that error appears in the above-identified patent and that said Letters Patent is hereby corrected as shown below:

On Title Page 2, in Item (56), References Cited under "OTHER PUBLICATIONS", in Column 2, Lines 1-2, delete "Interative Weighted Regularized Algorithm for Impriving" and insert -- Iterative Weighted Regularized Algorithm for Improving --, therefor.

In the Specification

In Column 1, below Title, insert -- CROSS-REFERENCE TO RELATED APPLICATIONS
The present application is a U.S. national stage filing under 35 U.S.C. §371 of International Application No. PCT/US2011/035490, filed on May 6, 2011. --.

In Column 7, Lines 66-67, delete "preprogramed" and insert -- preprogrammed --, therefor.

In Column 14, Line 29, delete "microprocessor based" and insert -- microprocessor-based --, therefor.

In the Claims

In Column 17, Line 27, in Claim 16, delete "camera to" and insert -- camera to: --, therefor.

Signed and Sealed this
Ninth Day of June, 2015

Michelle K. Lee
*Director of the United States Patent and Trademark Office*